United States Patent
Kang et al.

(10) Patent No.: US 10,505,216 B2
(45) Date of Patent: Dec. 10, 2019

(54) SECONDARY BATTERY

(71) Applicant: LG Chem, Ltd., Seoul (KR)

(72) Inventors: Jung Koo Kang, Daejeon (KR); Joo Hwan Sung, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/552,019

(22) PCT Filed: Nov. 16, 2016

(86) PCT No.: PCT/KR2016/013209
§ 371 (c)(1),
(2) Date: Aug. 18, 2017

(87) PCT Pub. No.: WO2017/090932
PCT Pub. Date: Jun. 1, 2017

(65) Prior Publication Data
US 2018/0254505 A1    Sep. 6, 2018

(30) Foreign Application Priority Data

Nov. 26, 2015 (KR) .................. 10-2015-0166666
Nov. 3, 2016 (KR) .................. 10-2016-0145521

(51) Int. Cl.
| | |
|---|---|
| *H01M 10/04* | (2006.01) |
| *H01M 2/34* | (2006.01) |
| *H01M 4/13* | (2010.01) |
| *H01M 10/42* | (2006.01) |
| *H01M 10/0525* | (2010.01) |
| *H01M 10/0587* | (2010.01) |

(52) U.S. Cl.
CPC ......... *H01M 10/0431* (2013.01); *H01M 2/34* (2013.01); *H01M 4/13* (2013.01);
(Continued)

(58) Field of Classification Search
CPC ......... H01M 10/0431; H01M 10/0525; H01M 10/4235; H01M 10/0587; H01M 2/34; H01M 4/13
See application file for complete search history.

(56) References Cited

U.S. PATENT DOCUMENTS

| | | |
|---|---|---|
| 2002/0004171 A1 | 1/2002 | Kimijima et al. |
| 2006/0216609 A1 | 9/2006 | Abe et al. |
| | (Continued) | |

FOREIGN PATENT DOCUMENTS

| | | |
|---|---|---|
| EP | 2139057 A1 | 12/2009 |
| JP | 2008041581 A | 2/2008 |
| | (Continued) | |

OTHER PUBLICATIONS

Extended European Search Report for Application No. EP16868829 dated Oct. 16, 2017.
(Continued)

*Primary Examiner* — Jimmy Vo
(74) *Attorney, Agent, or Firm* — Lerner, David, Littenberg, Krumholz & Mentlik, LLP (57) ABSTRACT

The present invention relates to a secondary battery including: an electrode assembly in which a plurality of electrodes and a plurality of separators are alternately stacked to each other and wound; an internal insulating tape attached to an inner surface of the electrode, wherein an attachment starting point (a) and an attachment ending point (b) are disposed in a line (A) that is directed to a winding center of the electrode assembly, and the internal insulating tape surrounds a central portion of the electrode assembly once; and an external insulating tape attached to an outer surface of the electrode corresponding to the internal insulating tape, wherein an attachment starting point (c) and an attachment ending point (d) are disposed in a line (B) that is directed to the winding center of the electrode assembly, and the
(Continued)

external insulating tape surrounds the central portion of the electrode assembly once.

11 Claims, 9 Drawing Sheets

(52) U.S. Cl.
CPC ... *H01M 10/0525* (2013.01); *H01M 10/4235* (2013.01); *H01M 10/0587* (2013.01); *H01M 2220/30* (2013.01)

(56) References Cited

U.S. PATENT DOCUMENTS

| | | |
|---|---|---|
| 2008/0280197 A1 | 11/2008 | Machida |
| 2010/0212817 A1 | 8/2010 | Nagare et al. |
| 2010/0285342 A1 | 11/2010 | Lee et al. |
| 2011/0014509 A1 | 1/2011 | Kim |
| 2013/0045405 A1 | 2/2013 | Ahn |
| 2014/0242433 A1 | 8/2014 | Kwon et al. |

FOREIGN PATENT DOCUMENTS

| | | |
|---|---|---|
| KR | 20090082561 A | 7/2009 |
| KR | 100958649 B1 | 5/2010 |
| KR | 20100096018 A | 9/2010 |
| KR | 20110007524 A | 1/2011 |
| KR | 20130020550 A | 2/2013 |
| KR | 20150028790 A | 3/2015 |
| WO | 2009128605 A2 | 10/2009 |

OTHER PUBLICATIONS

Search Report from International Application No. PCT/KR2016/013209, dated Feb. 22, 2017.

SECONDARY BATTERY

CROSS-REFERENCE TO RELATED APPLICATION

The present application is a national phase entry under 35 U.S.C. § 371 of International Application No. PCT/KR2016/013209 filed Nov. 16, 2016, which claims priority from Korean Patent Application Nos. 10-2015-0166666, filed on Nov. 26, 2015, and 10-2016-0145521, filed on Nov. 3, 2016, all of which are incorporated herein by reference.

TECHNICAL FIELD

The present invention relates to a secondary battery, and more particularly, to a secondary battery in which a stepped portion between an electrode and an insulating tape is removed.

BACKGROUND ART

In general, secondary batteries refer to chargeable and dischargeable batteries, unlike primary batteries that are not chargeable. The secondary batteries are being widely used in the high-tech electronic fields such as mobile phones, notebook computers, and camcorders.

DISCLOSURE OF THE INVENTION

Technical Problem

A secondary battery includes an electrode assembly in which a positive electrode, a separator, and a negative electrode are successively stacked and then wound in the form of a jelly-roll, a can in which the electrode assembly is accommodated, and a cap assembly mounted on an opening of the can. A positive electrode tab is coupled to the positive electrode, and a negative tab is coupled to the negative electrode.

Here, an insulating tape is attached to the positive electrode to which the positive tab is coupled and the negative electrode to which the negative tab is coupled to improve an insulating property.

However, in the secondary battery according to the related art, a stepped portion may occur between the positive electrode or the negative electrode and an end of the insulating tape to cause disconnection and ignition due to the stepped portion.

The present invention has been made to solve the above problems, and an object of the present invention is to provide a secondary battery in which both ends of an insulating tape attached to an electrode assembly are formed to correspond to or overlap each other to remove a stepped portion between a positive electrode or a negative electrode and the ends of the insulating tape, thereby preventing disconnection and ignition from occurring.

Technical Solution

To achieve the abovementioned objects, the present invention provides a secondary battery including: an electrode assembly in which a plurality of electrodes and a plurality of separators are alternately stacked to each other and wound; an internal insulating tape attached to an inner surface of the electrode, wherein an attachment starting point (a) and an attachment ending point (b) are disposed in a line (A) that is directed to a winding center of the electrode assembly, and the internal insulating tape surrounds a central portion of the electrode assembly once; and an external insulating tape attached to an outer surface of the electrode corresponding to the internal insulating tape, wherein an attachment starting point (c) and an attachment ending point (d) are disposed in a line (B) that is directed to the winding center of the electrode assembly, and the external insulating tape surrounds the central portion of the electrode assembly once.

The line (A) and the line (B) may be disposed to cross each other.

The line (A) and the line (B) may be disposed to cross each other by a length of about 1 mm to about 32 mm along a circumference of the electrode to which the internal and external insulating tapes are attached.

The line (A) and the line (B) may be disposed to correspond to each other.

The attachment starting point (a) and the attachment ending point (b) of the internal insulating tape may do not overlap each other.

The attachment starting point (c) and the attachment ending point (d) of the external insulating tape may do not overlap each other.

The attachment starting point (a) of the internal insulating tape may be attached farther forward than the attachment starting point (c) of the external insulating tape in a winding direction, and an end of the internal insulating tape, at which the attachment starting point (a) of the internal insulating tape is defined, and an end of the external insulating tape, at which the attachment ending point (d) of the external insulating tape is defined, may overlap each other by a length between the line (A) and the line (B).

The attachment starting point (a) of the internal insulating tape may be attached farther forward than the attachment starting point (c) of the external insulating tape in a winding direction, and an end of the internal insulating tape, at which the attachment ending point (b) of the internal insulating tape is defined, and an end of the external insulating tape, at which the attachment starting point (c) of the external insulating tape is defined, may overlap each other by a length between the line (A) and the line (B).

The electrode to which the internal and external insulating tapes are attached may be a positive electrode.

An electrode tab may be coupled to the inner surface of the electrode to which the internal insulating tape is attached.

The internal insulating tape and the external insulating tape may have the same width.

Advantageous Effects

The present invention has effects as follows.

First: According to the present invention, the internal and external insulating tapes may be respectively attached to the inside and outside of the electrode to which the electrode tab of the electrode assembly is coupled to improve the strength and the insulating property.

Second: According to the present invention, both the ends of each of the external and internal insulating tapes are attached to correspond to each other to remove the stepped portion between the insulation tape and the electrode and prevent the disconnection and the ignition from occurring.

Third: According to the present invention, both the ends of each of the external and internal insulating tapes are attached to cross each other to improve the strength of the electrode.

MODE FOR CARRYING OUT THE INVENTION

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

First Embodiment of the Present Invention

Figure 1:
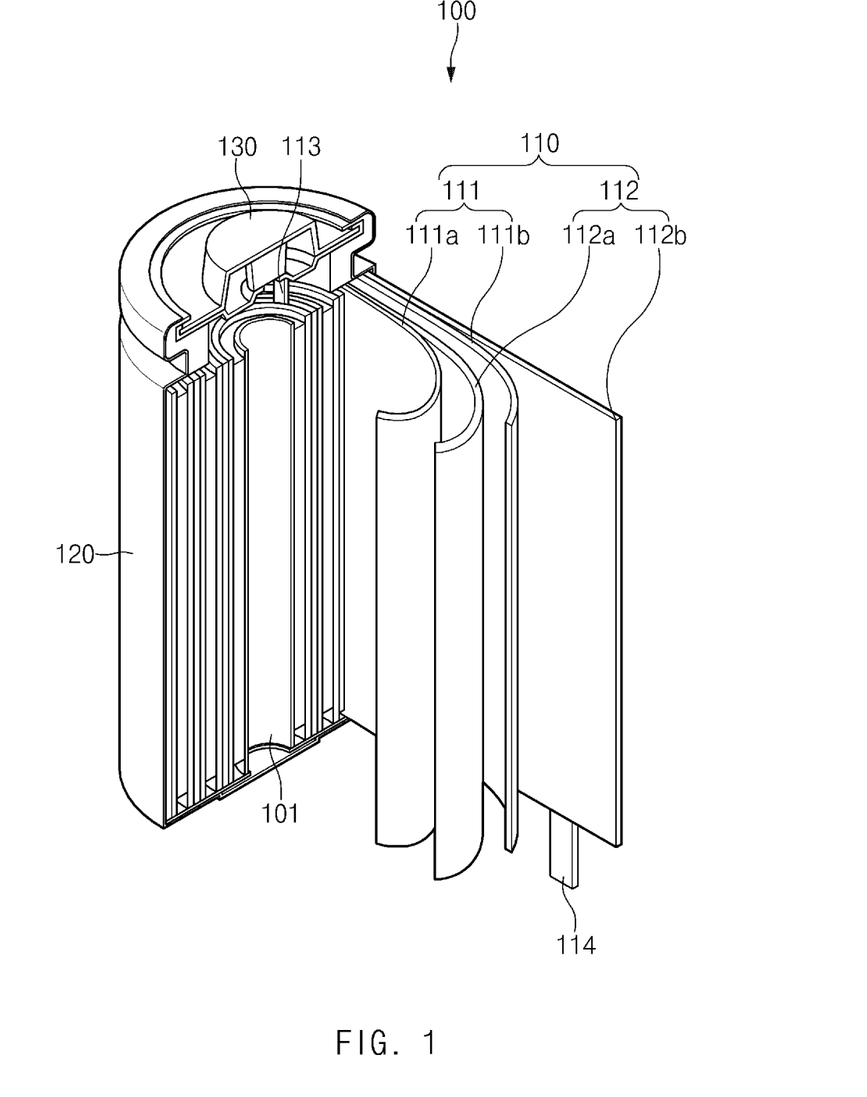
FIG. 1 is a cross-sectional view of a secondary battery according to the present invention.

As illustrated in FIG. 1, a secondary batter 100 according to a first embodiment of the present invention includes an electrode assembly 110 in which a plurality of electrodes 111, to which an electrode tab is coupled, and a plurality of separators 112 are alternately stacked to each other, a can in which the electrode assembly 110 is accommodated, and a cap assembly 130 mounted on an opening of the can 120. Also, a core 101 is inserted into a center of the electrode assembly 110.

Figure 2:
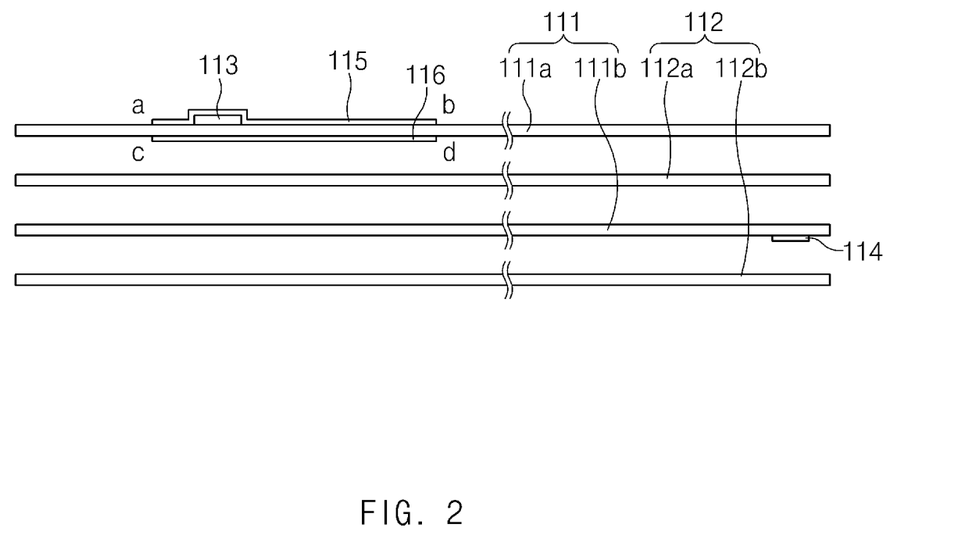
FIG. 2 is a cross-sectional view before an electrode assembly is wound according to a first embodiment of the present invention.

Here, as illustrated in FIG. 2, the electrode assembly 110 is provided as a jelly-roll electrode assembly and includes the plurality of electrodes 111, each of which is provided in the form of a sheet and the separators 112, each of which is disposed between the plurality of electrodes 111 and provided in the form of a sheet. Also, the plurality of electrodes 111 include first and second electrodes 111a and 111b, and the plurality of separators 112 include first and second separators 112a and 112b.

Thus, the electrode assembly 110 has a structure in which the first electrode 111a, the first separator 112a, the second electrode 111b, and the second separator 112b are successively stacked to each other and then wound.

Also, electrode tabs 113 and 114 are respectively coupled to front ends or rear ends of the plurality of electrodes 111.

That is, a first electrode tab 113 connected to the cap assembly 130 is coupled to the front end of the first electrode 111a, and a second electrode tab 114 connected to a bottom surface of the can 120 is coupled to the rear end of the second electrode 111b. Here, the first electrode may be a positive electrode, and the second electrode may be a negative electrode.

An insulating tape for preventing electric short from occurring may be attached to the electrode to which the electrode tab is coupled.

Figure 3:
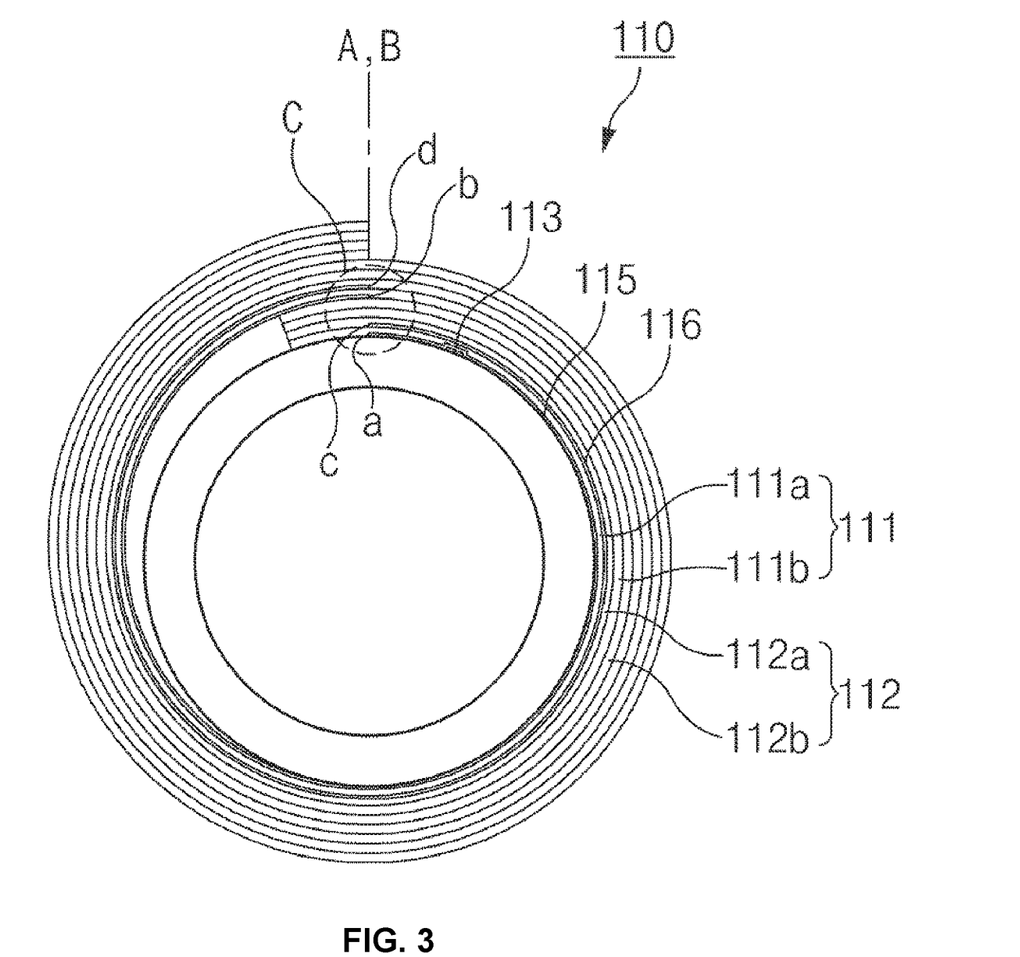
FIG. 3 is a cross-sectional view after the electrode assembly is wound according to the first embodiment of the present invention.

That is, as illustrated in FIGS. 2 and 3, the electrode assembly 110 includes an internal insulating tape 115 disposed inside the first electrode 111a to which the first electrode tab 113 is coupled and an external insulating tape 116 disposed outside the first electrode 111a to correspond to the internal insulating tape 115.

Thus, the internal insulating tape 115 is attached to an inner surface of the first electrode 111a, to which the first electrode tab 113 is coupled, to wind the electrode assembly 110 once, and the external insulating tape 116 is attached to an outer surface of the first electrode 111a corresponding to the internal insulating tape 115 to wind the electrode assembly 100 once.

Figure 4:
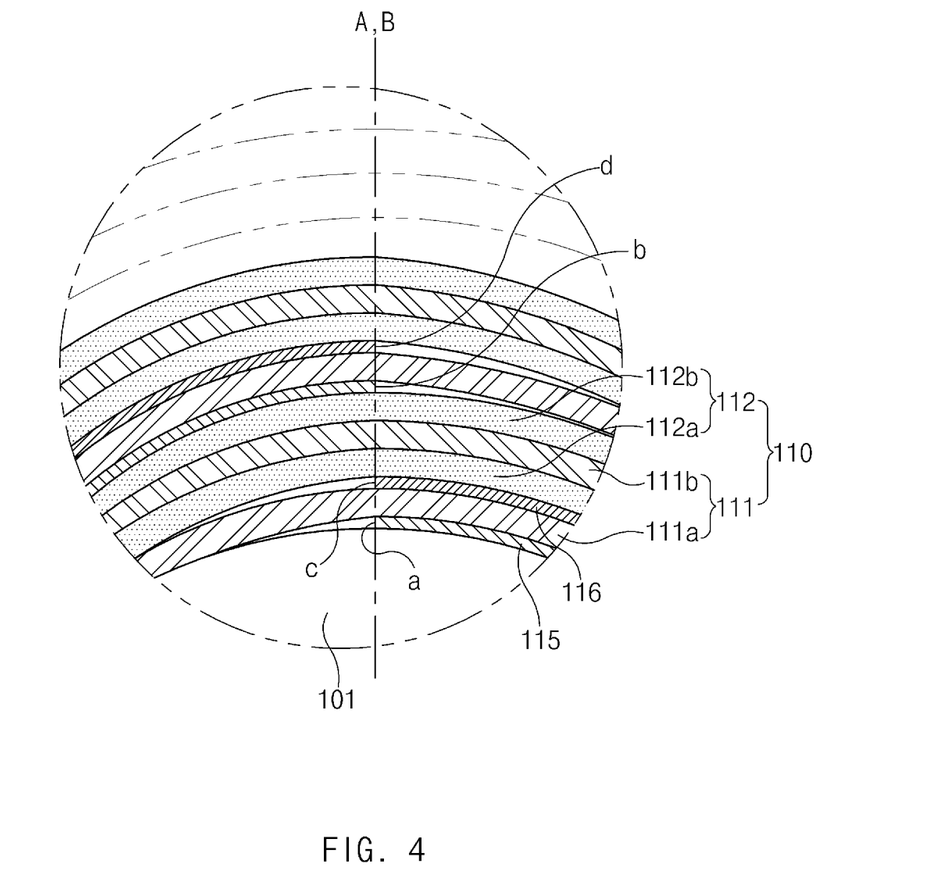
FIG. 4 is an enlarged view of a portion C illustrated in FIG. 3.

In details with reference to FIGS. 3 and 4, the internal insulating tape 115 is attached to the inner surface of the first electrode 111a. Here, an attachment starting point a and an attachment ending point b of the internal insulating tape 115 are disposed in a line A that is directed to a winding center of the electrode assembly 110, and the internal insulating tape 115 surrounds a central portion of the electrode assembly 110 once. The external insulating tape 116 is attached to the outer surface of the first electrode 111a corresponding to the internal insulating tape 115. Here, an attachment starting point c and an attachment ending point d of the external insulating tape 116 are disposed in a line B that is directed to the winding center of the electrode assembly 110, and the external insulating tape 116 surrounds the central portion of the electrode assembly 110 once. That is, in the electrode assembly 110, the first electrode 111a to which the first electrode tab 113 is coupled may be improved in insulating property by the internal and external insulating tapes 115 and 116, which surround the electrode assembly 110 once.

As illustrated in FIG. 4, the line A and the line B are disposed to correspond to each other. That is, the line A at which the attachment starting point a and the attachment ending point b of the internal insulating tape 115 meet each other and the line B at which the attachment starting point c and the attachment ending point d of the external insulating tape 116 meet each other may be disposed to correspond to each other. Thus, a stepped portion between the internal insulating tape 115 and the external insulating tape 116 may be prevented from occurring.

As illustrated in FIGS. 5 to 8, the line A and the line B may be disposed to cross each other. That is. the line A at which the attachment starting point a and the attachment ending point b of the internal insulating tape 115 meet each other and the line B at which the attachment starting point c and the attachment ending point d of the external insulating tape 116 meet each other may be disposed to cross each other. Thus, the first electrode 111a disposed between the internal insulating tape 115 and the external insulating tape 116 may be improved in strength.

The lines A and B may be disposed to cross each other by a length of about 1 mm to about 32 mm, preferably, about 5 mm along a circumference of the first electrode 111a to which the internal and external insulating tapes 115 and 116 are attached. That is, when the distance between the lines A and B is equal to or less than about 1 mm, since the distance by which the lines A and B cross each other is short, it is difficult to expect the improvement in strength of the first electrode 111*a*. When the distance between the lines A and B is equal to or greater than about 32 mm, although the first electrode 111*a* is improved in strength, the internal and external insulating tapes 115 and 116 may be used more than necessary to cause unnecessary expense. The lines A and B may be disposed to cross each other by a length of about 1 mm to about 32 mm to minimize the expense while improving the strength of the first electrode 111*a*.

Figure 5:
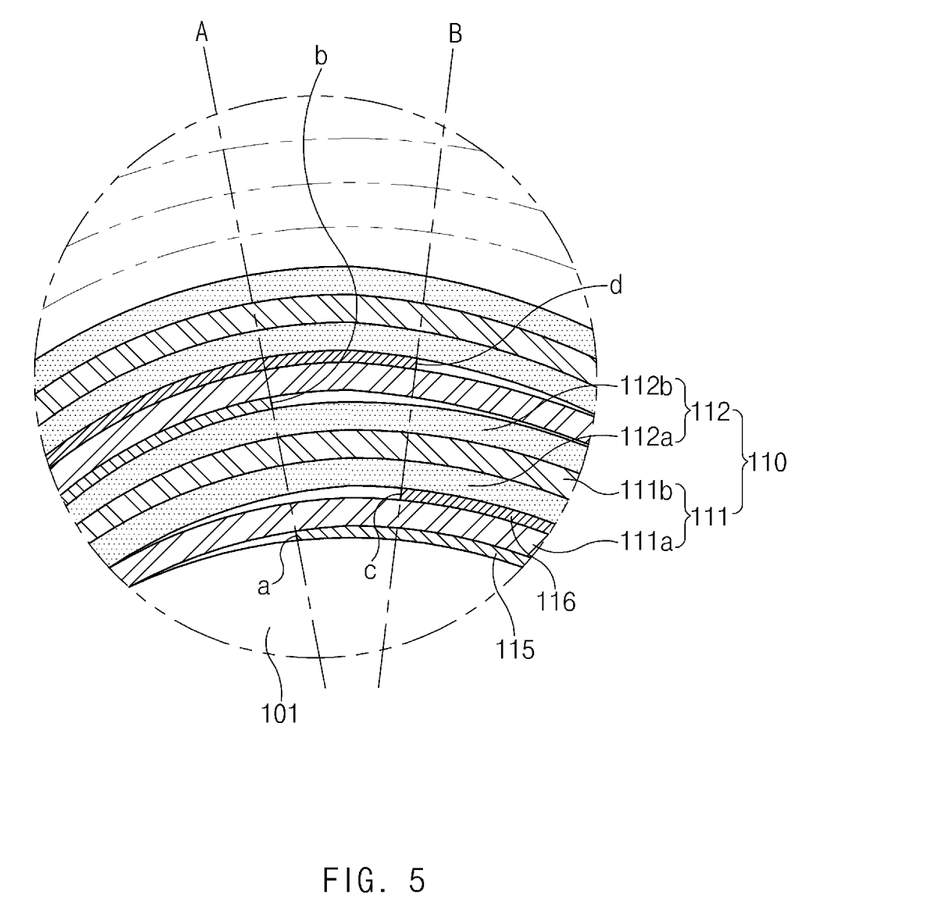
FIG. 5 is an enlarged view of an electrode assembly according to a second embodiment of the present invention.

Referring to FIG. 5, the attachment starting point a and the attachment ending point b of the internal insulating tape 115 may not overlap each other to prevent the stepped portion from occurring. Also, the attachment starting point c and the attachment ending point d of the external insulating tape 116 may not overlap each other to prevent the stepped portion from occurring.

The internal and external insulating tapes 115 and 116 may have the same width. Particularly, each of the internal and external insulating tapes 115 and 116 may have the same width as the first electrode 111*a*. Thus, the first electrode 111*a* may be improved in insulating property and strength in a width direction thereof by the internal and external insulating tapes 115 and 116.

Thus, in the secondary battery 100 according to the first embodiment of the present invention, the internal and external insulating tapes may be respectively attached to the inner and outer surfaces of the electrode, to which the electrode tab is coupled, to improve the insulating property and the strength of the electrode and also prevent the stepped portion from occurring, and thereby to prevent disconnection and ignition from occurring.

Hereinafter, in description of a secondary battery according to another embodiment of the present invention, components of the current embodiment having the same construction and function as the first embodiment have been given the same reference numeral in the drawings, and thus duplicated description will be omitted.

Second Embodiment of the Present Invention

Although the stepped portion is reduced by the internal and external insulating tapes in the secondary battery 100 according to the first embodiment of the present invention, the electrode disposed at the end at which the attachment starting point a and the attachment ending point b of the internal insulating tape 115 meet each other or the end at which the attachment starting point c and the attachment ending point d of the external insulating tape 116 meet each other may be deteriorated in strength.

On the other hand, as illustrated in FIGS. 6 to 9, in a secondary battery according to the second embodiment of the present invention, an internal insulating tape 115 and an external insulating tape 116 may be attached to partially overlap each other, thereby preventing an electrode from being deteriorated in strength.

That is to say, in the secondary battery according to the second embodiment of the present invention, the internal insulating tape and the external insulating tape may be respectively attached to an inner surface and an outer surface of the electrode. Here, an attachment starting point of the internal insulating tape may move farther forward than an attachment starting point of the external insulating tape or move farther backward than the attachment starting point of the external insulating tape to allow the internal and external insulating tapes 115 and 116 to partially overlap each other.

First Example of Second Embodiment

Figure 6:
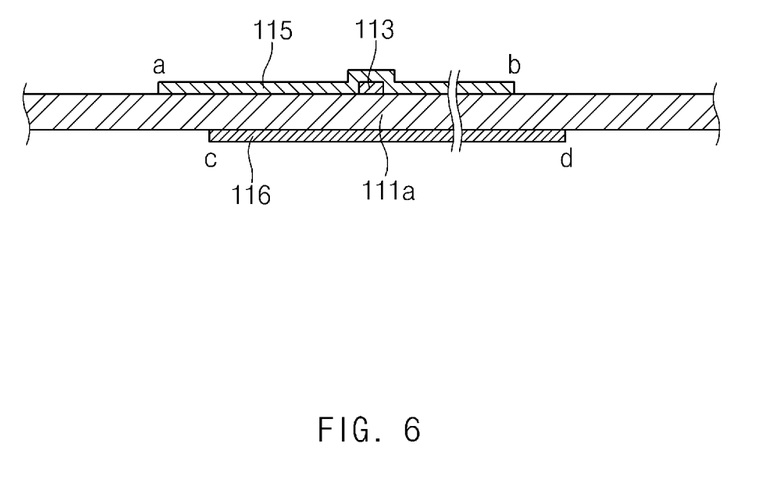
FIG. 6 is a cross-sectional view before a first electrode is wound according to a first example of the second embodiment.
Figure 7:
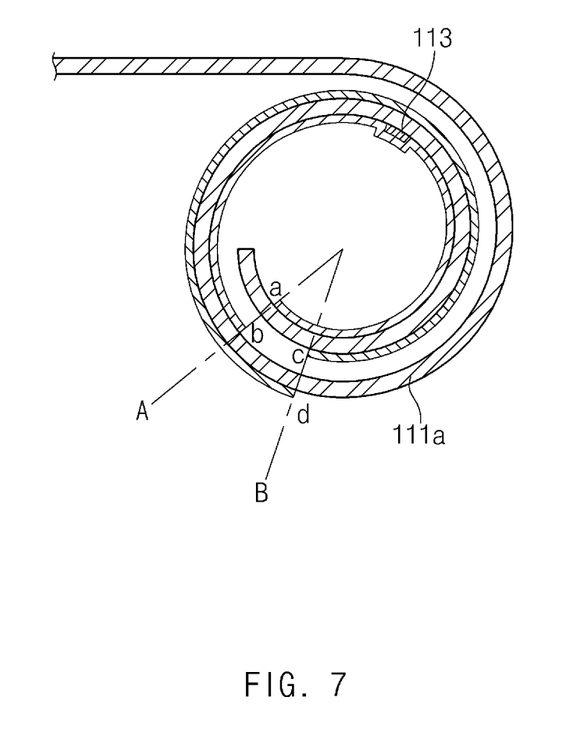
FIG. 7 is a cross-sectional view while the first electrode is wound according to the first example of the second embodiment.
Figure 8:
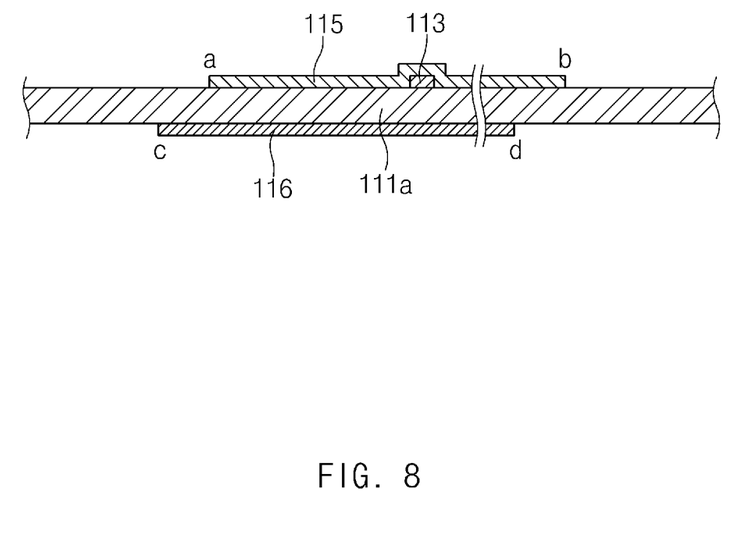
FIG. 8 is a cross-sectional view before the first electrode is wound according to a second example of the second embodiment.

In the secondary battery 100 according to the first example, as illustrated in FIGS. 6 and 7, the internal insulating tape 115 and the external insulating tape 116 are respectively attached to an inner surface and an outer surface of a first electrode 111*a*. Here, an attachment starting point a of the internal insulating tape 115 is attached farther forward than an attachment starting point c of the external insulating tape 116 in a winding direction (in a left direction in FIG. 6).

In more detail, as illustrated in FIG. 7, the end of the internal insulating tape 115, at which the attachment starting point a of the internal insulating tape 115 is defined and the end of the external insulating tape 116, at which an attachment ending point d of the external insulating tape 116 is defined may overlap each other by a length between the line A and the line B.

Thus, in the secondary battery 100 according to the first example, the attachment starting point a of the internal insulating tape 115 and the attachment ending point d of the external insulating tape 116 may partially overlap each other to prevent the first electrode 111*a* disposed between the internal insulating tape 115 and the external insulating tape 116 from being deteriorated in strength.

Second Example of Second Embodiment

In the secondary battery 100 according to the second example, the internal insulating tape 115 and the external insulating tape 116 are respectively attached to an inner surface and an outer surface of a first electrode 111. Here, the attachment starting point a of the internal insulating tape 115 is attached farther backward than the attachment starting point c of the external insulating tape 116 in the winding direction (in a left direction in FIG. 8).

Figure 9:
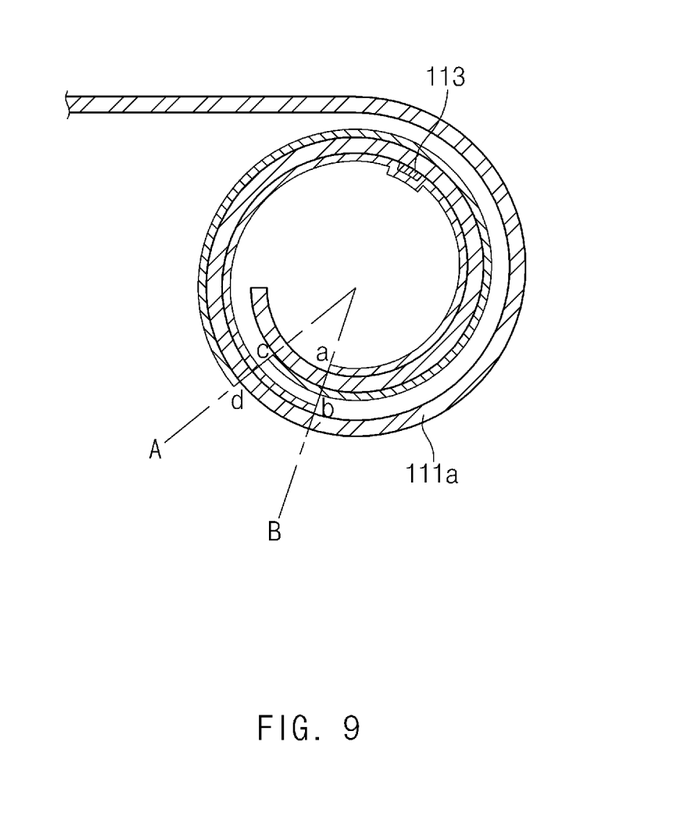
FIG. 9 is a cross-sectional view while the first electrode is wound according to the second example of the second embodiment.

In more detail, as illustrated in FIG. 9, the end of the internal insulating tape 115, at which an attachment ending point b of the internal insulating tape 115 is defined and the end of the external insulating tape 116, at which an attachment starting point c of the external insulating tape 116 is defined may overlap each other by a length between the line A and the line B.

Thus, in the secondary battery 100 according to the second example, the attachment ending point b of the internal insulating tape 115 and the attachment starting point c of the external insulating tape 116 may partially overlap each other to prevent the first electrode 111*a* disposed between the internal insulating tape 115 and the external insulating tape 116 from being deteriorated in strength.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A secondary battery comprising:
   an electrode assembly in which a plurality of electrodes and a plurality of separators are alternately stacked to each other and wound;
   an internal insulating tape attached to an inner surface of the electrode, wherein an attachment starting point (a) and an attachment ending point (b) are disposed in a line (A) that is directed to a winding center of the electrode assembly, and the internal insulating tape surrounds a central portion of the electrode assembly once; and an external insulating tape attached to an outer surface of the electrode corresponding to the internal insulating tape, wherein an attachment starting point (c) and an attachment ending point (d) are disposed in a line (B) that is directed to the winding center of the electrode assembly, and the external insulating tape surrounds the central portion of the electrode assembly once.

2. The secondary battery of claim 1, wherein the line (A) and the line (B) are disposed to cross each other.

3. The secondary battery of claim 2, wherein the line (A) and the line (B) are disposed to cross each other by a length of about 1 mm to about 32 mm along a circumference of the electrode to which the internal and external insulating tapes are attached.

4. The secondary battery of claim 1, wherein the line (A) and the line (B) are disposed to correspond to each other.

5. The secondary battery of claim 1, wherein the attachment starting point (a) and the attachment ending point (b) of the internal insulating tape do not overlap each other.

6. The secondary battery of claim 1, wherein the attachment starting point (c) and the attachment ending point (d) of the external insulating tape do not overlap each other.

7. The secondary battery of claim 1, wherein the attachment starting point (a) of the internal insulating tape is attached farther forward than the attachment starting point (c) of the external insulating tape in a winding direction, and an end of the internal insulating tape, at which the attachment starting point (a) of the internal insulating tape is defined, and an end of the external insulating tape, at which the attachment ending point (d) of the external insulating tape is defined, overlap each other by a length between the line (A) and the line (B).

8. The secondary battery of claim 1, wherein the attachment starting point (a) of the internal insulating tape is attached farther backward than the attachment starting point (c) of the external insulating tape in a winding direction, and an end of the internal insulating tape, at which the attachment ending point (b) of the internal insulating tape is defined, and an end of the external insulating tape, at which the attachment starting point (c) of the external insulating tape is defined, overlap each other by a length between the line (A) and the line (B).

9. The secondary battery of claim 1, wherein the electrode to which the internal and external insulating tapes are attached is a positive electrode.

10. The secondary battery of claim 1, wherein an electrode tab is coupled to the inner surface of the electrode to which the internal insulating tape is attached.

11. The secondary battery of claim 1, wherein the internal insulating tape and the external insulating tape have the same width.

* * * * *